Nov. 9, 1926.

L. B. MANN 1,606,586

BRAKE MECHANISM FOR RAILWAY CARS

Filed Feb. 1, 1923

Inventor:
Lester B. Mann

Patented Nov. 9, 1926.

1,606,586

UNITED STATES PATENT OFFICE.

LESTER B. MANN, OF CHICAGO, ILLINOIS, ASSIGNOR TO THE UNIVERSAL DRAFT GEAR ATTACHMENT COMPANY, OF CHICAGO, ILLINOIS, A CORPORATION OF ILLINOIS.

BRAKE MECHANISM FOR RAILWAY CARS.

Application filed February 1, 1923. Serial No. 616,299.

This invention relates to brake mechanism for railway cars and has for its principal object to permit the brakes to be applied by hand with speed and power comparable to the air operated mechanism.

A further object of the invention is to provide a differential leverage between the brake staff and the brake lever that will first multiply the speed of the brake staff to quickly take up the slack, and afterwards will multiply the power of the brake staff to apply the braking pressure.

Further objects of the invention will become apparent as the description is read in connection with the accompanying drawings, illustrating a selected embodiment of the invention, in which—

Figures 1, 2, 3, 4:
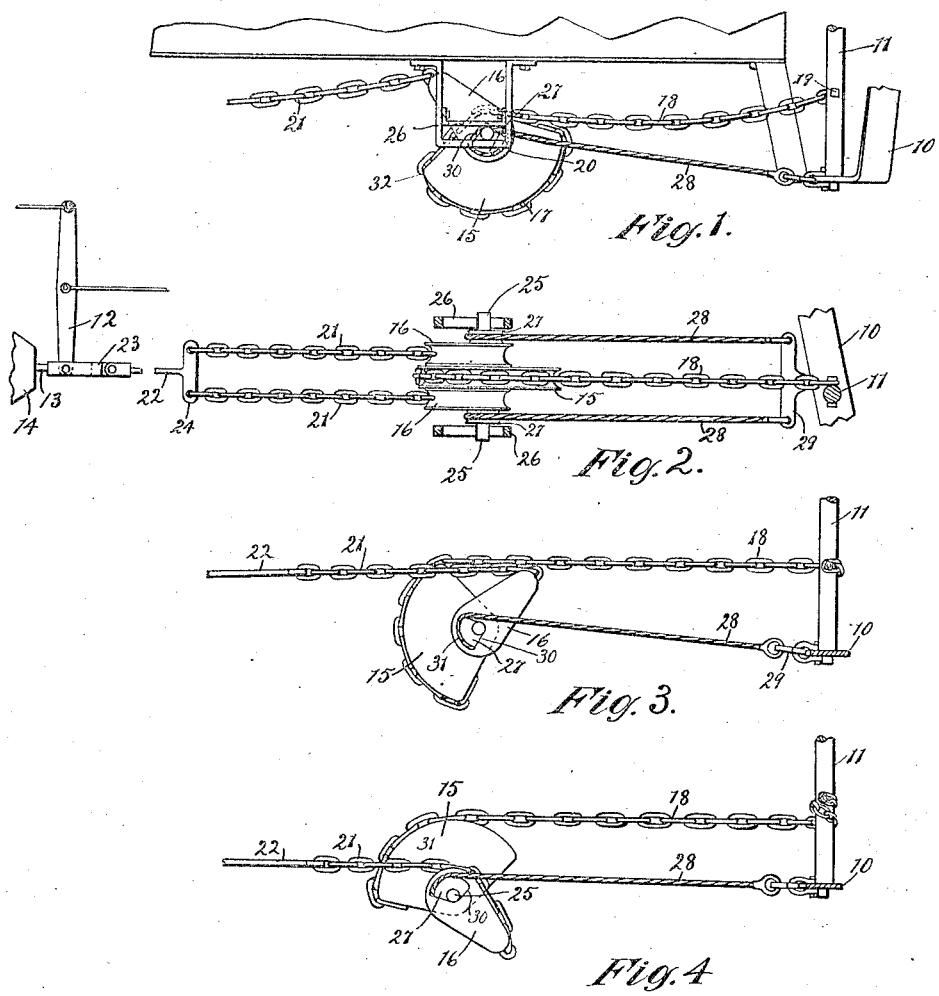
Fig. 1 is a side elevation illustrating a portion of a brake mechanism made according to the invention.
Fig. 2 is a plan view of the mechanism shown in Fig. 1.
Fig. 3 is an elevation similar to Fig. 1, showing the parts in the position they assume when the slack is about taken up.
Fig. 4 is another similar elevation showing the parts in a position they assume during the application of the braking pressure.

Referring to the drawings, the reference numeral 10 indicates a brake step or other support, in which the brake staff 11 is journaled. A brake lever 12 is suitably connected with the brakes (not shown) and adapted to be operated by a push rod 13, connected with a piston in the air cylinder 14. These parts may be of the usual or any suitable construction.

An expansible and contractible connection is provided between the brake staff and the brake lever for first multiplying the speed in the brake staff to take up the slack and set the brakes, and then multiplying the power of the brake staff and applying the braking pressure. As illustrated, this connection includes a multiplying lever similar to that shown in my copending application, Serial No. 605,906, filed Dec. 9, 1922, and including an arm 15, called a staff arm, and an arm 16, called a brake arm. As set forth in the said copending application the staff arm is equipped with a drum surface 17, and has a groove to receive and cooperate with a cable 18, in winding engagement with the brake staff at 19; and the brake arm has a drum surface 20, and is also grooved to cooperate with the cable 21, leading to the brake rod 22, which is suitably connected with the lever 12 as by the member 23. As shown, the arm 16 is in two like sections, each of which cooperates with a chain forming a branch of the cable 21 and connected with a stirrup 24 on the brake rod. The details of these arms and the operation of the device thus far described, are set forth and claimed in my copending application.

In the prior construction, the multiplying lever was journaled in fixed bearings supported by a car frame which is a very satisfactory arrangement, but under some conditions of service these bearings develop so much friction as to materially reduce the efficiency of the mechanism. To provide for these conditions, the multiplying lever is given a rolling engagement with the car frame which permits it to travel as it rotates, practically without friction. As shown, the lever is equipped with spindles 25, running in suitable guides 26, carried by the frame, and it also has anchor arms 27, cooperating with cables 28, anchored to the car frame at 29. The cables 28 are formed into a bight about the arms 27, and when the multiplying lever is rotated in a clockwise direction, they unwind, as illustrated in Figs. 3 and 4, and permit the lever to travel as a whole, to the left, in the drawings.

This arrangement, besides reducing the friction to a negligible quantity, results in a differential movement that clearly adds to the power of the mechanism. As here shown, the leverage of the arms 27 is very short to reduce the travel of the lever to a very small amount, and thereby keep the quantity of chain to be wound on the brake staff within fairly narrow limits. This arrangement gives a high multiplication of the power applied to the brake staff, but where the quantity of chain wound on the staff, or the number of turns of the staff in applying a braking pressure, is not of so great importance, the leverage of the arms 27 can be increased and the power developed proportionately multiplied.

The arms 15 and 16 are so arranged as particularly set forth in my copending application, to take advantage of the fact that a point traveling in a circular path will, in some arcs, move principally in one direction, and in other arcs, move principally in other directions, and thereby greatly multiply the speed of the brake staff in its initial movement to take up the slack, and thereafter to multiply the power in developing the braking pressure. Since both the friction and the mechanical advantage of the device are relatively unimportant, during the take up of the slack, I prefer to also arrange and construct the arms 27 in such a way that the initial rotation of the multiplying lever will cause very little travel. This is accomplished by having the leading faces 30 of the arms 27, extend substantially at the angle shown in Fig. 1 when the mechanism is slack, and providing drum surfaces 31 to cooperate with the cables 28, as the parts pass through the successive positions illustrated in Figs. 3 and 4. By this arrangement, with the parts in the position shown in Fig. 1, the points of application, 32, of the pull on the anchor chains 28 will first travel principally in a direction transverse to the length of those chains and will therefore permit a very slight movement of the lever as a whole, to the right of the drawing. After the ratio of leverage passes through unity as in the position shown in Fig. 3, the lever will move toward the left, thus causing the cable 28 to tend to rotate the drum 27 and with it said lever. It is not necessary that the leading face 30 of the arms 27, extend to the axis of the lever, for the arms may take the form of a segment less than a semi-circle.

I claim as my invention:

1. In a brake mechanism for railway cars, the combination of a car frame, a brake staff, a brake lever, a multiplying lever having an individual staff arm connected with the brake staff, and an individual brake arm connected with the brake lever, and a connection between the multiplying lever and the car frame, permitting it to travel in a direction opposite to the pull of the brake staff.

2. In a brake mechanism for railway cars, the combination of a car frame, a brake staff, a brake lever, a multiplying lever having a staff arm and a brake arm, a connection between the staff arm and the brake staff, a connection between the brake arm and the brake lever, and a connection between the multiplying lever and the car frame, permitting it to travel in a direction opposite to the connection with the brake staff, and at a less speed than the speed of said connection relative to the multiplying lever.

3. In a brake mechanism for railway cars, the combination of a car frame, a brake staff, a brake lever, a multiplying lever having a staff arm connected with the brake staff, a brake arm connected with the brake lever and a rolling connection between the multiplying lever and the car frame, permitting it to travel away from the brake staff while rotating in response to a pull therefrom.

4. In a brake mechanism for railway cars, the combination of a car frame, a brake staff, a brake lever, a multiplying lever having a staff arm and a brake arm, a connection between the staff arm and the brake staff, a connection between the brake arm and the brake lever, one of said arms being arranged to first multiply the speed of the brake staff and then multiply the power of the brake staff, and means connecting the multiplying lever with the car frame, permitting it to rotate and to travel away from the brake staff during the application of the braking pressure.

5. In a brake mechanism for railway cars, the combination of a car frame, a brake staff, a brake lever, a multiplying lever having a staff arm connected with the brake staff, a brake arm connected with the brake lever, and an anchor arm anchored to the car frame, said anchor arm and staff arm extending in the same general direction.

6. In a brake mechanism for railway cars, the combination of a car frame, a brake staff, a brake lever, a multiplying lever having a staff arm connected with the brake staff, a brake arm connected with the brake lever, an anchor arm anchored to the car frame, the leverage of the anchor arm being less than the leverage of the staff arm, and opposed to the leverage of the brake arm during the application of the braking pressure.

7. In a brake mechanism for railway cars, the combination of a car frame, a brake staff, a brake lever, a multiplying lever having a staff arm connected with the brake staff, a brake arm connected with the brake lever, an anchor arm anchored to the car frame, said arms having drum surfaces to maintain selected leverages through predetermined angles of rotation, and the leverage of the anchor arm being opposed to that of the brake arm during the application of the braking pressure.

8. In a brake mechanism for railway cars, the combination of a car frame, a support mounted on said frame, a brake staff, a brake lever, a multiplying lever mounted in said support and having a staff arm connected with the brake staff, a brake arm connected with the brake lever and an anchor arm connected to the car frame, said multiplying lever having a movable engagement with the support to permit the lever to travel away from the brake staff in response to a pull therefrom.

9. In a brake mechanism for railway cars, the combination of a car frame, a support mounted on said frame, a brake staff, a brake lever, and a connection between the brake staff and the brake lever, including a differential lever mounted in said support and having a drum surface for a cable connected with the brake staff, a drum surface for a cable connected with the brake lever and means for permitting the differential lever to travel away from the brake staff in applying the braking pressure.

10. In a brake mechanism for railway cars, the combination of a car frame, a brake staff on said frame, a brake lever, a multiplying lever having a staff arm, a brake arm and an anchor arm, a cable connected to said brake staff and extending about said staff arm, a cable anchored at one end and extending about said anchor arm in the same direction as said first-named cable, and a cable connected to said brake arm and to said brake lever.

LESTER B. MANN.